United States Patent [19]
Sjoholm et al.

[11] Patent Number: 5,246,357
[45] Date of Patent: Sep. 21, 1993

[54] SCREW COMPRESSOR WITH OIL-GAS SEPARATION MEANS

[75] Inventors: Lars I. Sjoholm, Burnsville; Lee J. Erickson, Eagan; Dean W. Osterman, New Praque, all of Minn.

[73] Assignee: Westinghouse Electric Corp., Pittsburgh, Pa.

[21] Appl. No.: 919,801

[22] Filed: Jul. 27, 1992

[51] Int. Cl.$^5$ .................. F01C 21/04; B01D 19/00
[52] U.S. Cl. .................... 418/97; 418/201.1; 418/DIG. 1; 55/323
[58] Field of Search ............. 418/DIG. 1, 201.1, 97; 55/185

[56] References Cited

U.S. PATENT DOCUMENTS

| | | |
|---|---|---|
| 4,244,680 | 1/1981 | Ishizuka et al. ............ 418/DIG. 1 |
| 4,478,054 | 10/1984 | Shaw et al. |
| 4,506,523 | 3/1985 | Di Carlo et al. |
| 4,545,742 | 10/1985 | Schaefer . |
| 4,662,190 | 5/1987 | Tischer . |
| 4,758,136 | 7/1988 | Pamlin et al. |
| 4,773,229 | 9/1988 | Pamlin et al. |
| 4,850,197 | 7/1989 | Taylor et al. |
| 5,018,948 | 5/1991 | Sjöholm et al. |

FOREIGN PATENT DOCUMENTS

| | | |
|---|---|---|
| 238163 | 9/1987 | European Pat. Off. ...... 418/DIG. 1 |
| 25529 | 2/1980 | Japan ............ 418/DIG. 1 |
| 146098 | 9/1982 | Japan ............ 418/DIG. 1 |
| 185886 | 10/1984 | Japan ............ 418/201.1 |
| 3493 | 1/1985 | Japan ............ 418/201.1 |
| 118591 | 6/1986 | Japan ............ 418/DIG. 1 |
| 15693 | 1/1991 | Japan ............ 418/DIG. 1 |
| WO8703048 | 5/1987 | PCT Int'l Appl. . |
| WO8800294 | 1/1988 | PCT Int'l Appl. . |

Primary Examiner—Richard A. Bertsch
Assistant Examiner—Roland McAndrews
Attorney, Agent, or Firm—M. J. Moran

[57] ABSTRACT

An oil flooded screw compressor including suction, rotor, and discharge sections having suction, intermediate pressure, and discharge ports, respectively, and an oil sump. The discharge section includes radially spaced internal and external housings, with the internal housing receiving an oil-gas stream from the rotor section. A filter is disposed to surround the internal housing, with the filter including a cylindrical, foraminate body portion, an end wall, and a filter pad against the end wall. The oil-gas stream from the rotor section exits the inner housing, via an opening which forms part of a first stage of oil removal. The oil-gas stream strikes the filter pad, removing oil as the oil-gas stream is forced to turn 90 degrees to exit the filter through the foraminate body portion, which also removes oil. The filter functions as second and third stages of oil removal.

19 Claims, 5 Drawing Sheets

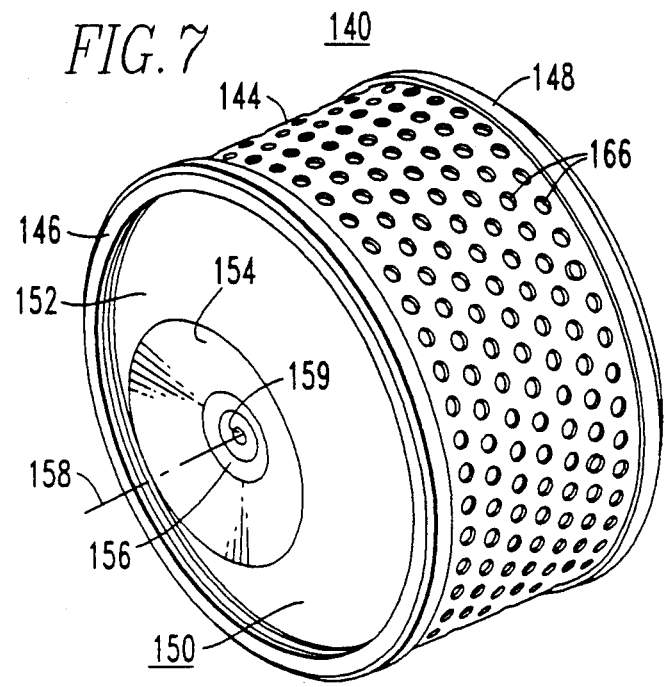
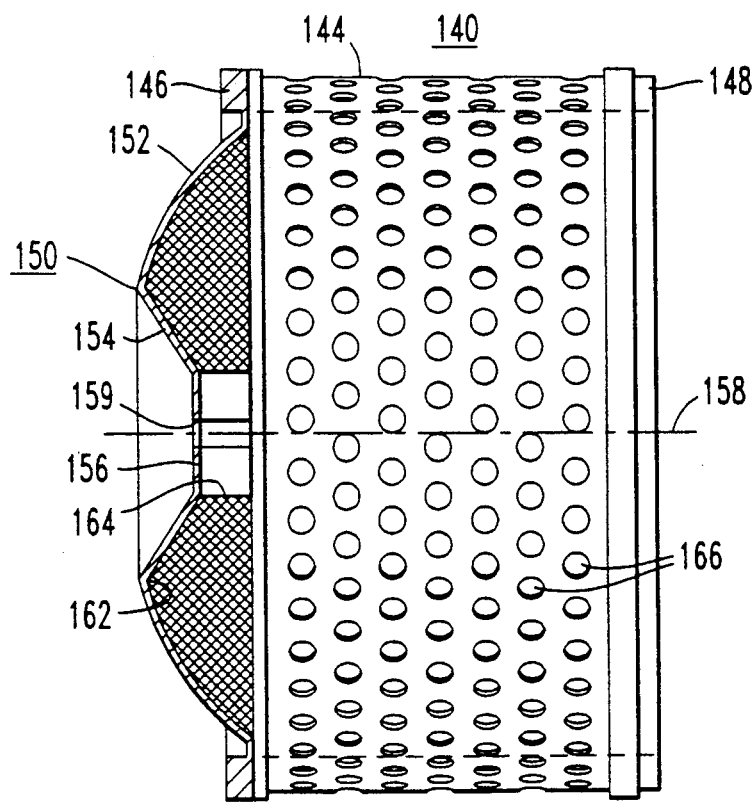

SCREW COMPRESSOR WITH OIL-GAS SEPARATION MEANS

The invention relates in general to a screw compressor, and more specifically to arrangements for separating oil from an oil-gas stream in an oil flooded screw compressor before the gas stream exits the compressor via a discharge port.

BACKGROUND ART

A screw compressor of the oil flooded type, such as a twin screw compressor, provides lubrication for a shaft seal and rotors, by injecting oil in the compressor which corresponds to about 10-40% of the weight of the gas flow. It is desirable to remove as much of the oil from the oil-gas stream as possible before it exits the compressor via a discharge port, especially in refrigeration applications, as oil carried into refrigerant flow circuits reduces the efficiency of heat transfer surfaces of the refrigeration system. Thus, it would be desirable, and it is an object of the invention, to provide a highly efficient oil removal arrangement for an oil flooded screw compressor.

SUMMARY OF THE INVENTION

Briefly, the invention is an oil flooded screw compressor which includes a drive shaft having a longitudinal drive axis for substantially horizontal orientation, suction, rotor and discharge sections having suction, intermediate pressure, and discharge ports, respectively, and an oil sump for collection of oil below the discharge section. The discharge section includes radially spaced internal and external housing means, with the internal housing means receiving an oil-gas stream from the rotor section. Filter means surrounds the internal housing means, with the filter means including a cylindrical, foraminate body portion having first and second axial ends, a longitudinal filter axis disposed parallel to the drive axis, a wall portion closing the first axial end, and an oil separating filter pad disposed against the wall portion. The discharge port and oil sump are respectively disposed above and below the filter axis. The oil-gas stream exits the internal housing means and enters the filter means via an opening in the internal housing means which is part of a first stage of oil removal. The oil-gas stream is directed by the opening against the filter pad, removing a portion of the oil as the oil-gas stream is forced to turn 90 degrees to exit the filter means through the foraminate cylindrical body portion of the filter, removing additional oil from the oil-gas stream before the gas stream exits the discharge port. Oil trapped by the first stage of oil removal, the filter pad, and the foraminate cylindrical body portion of the filter flows to the sump.

The first stage of oil removal preferably includes first and second openings in the internal housing means, with the first opening being the oil-gas stream opening, and with the second opening being an oil flow opening. The first opening is in a first wall of a cavity defined by the internal housing means, with the first wall being disposed substantially perpendicular to the oil-gas stream flow, separating oil from the flow stream as the oil-gas stream strikes the first wall and is forced to flow through the first opening. The second opening is in a second wall of the cavity, with the second wall being below and substantially perpendicular to the first wall. Oil collected in the cavity thus flows out the lower second opening, into the filter means, and to the sump.

BRIEF DESCRIPTION OF THE DRAWINGS

The invention will become more apparent by reading the following detailed description in conjunction with the drawings, which are shown by way of example only, wherein:

FIG. 6 is an elevational side view of a filter which is shown in section in FIG. 3; and FIG. 7 is a perspective view of the filter shown in FIG. 6.

DESCRIPTION OF PREFERRED EMBODIMENTS

Figure 2:
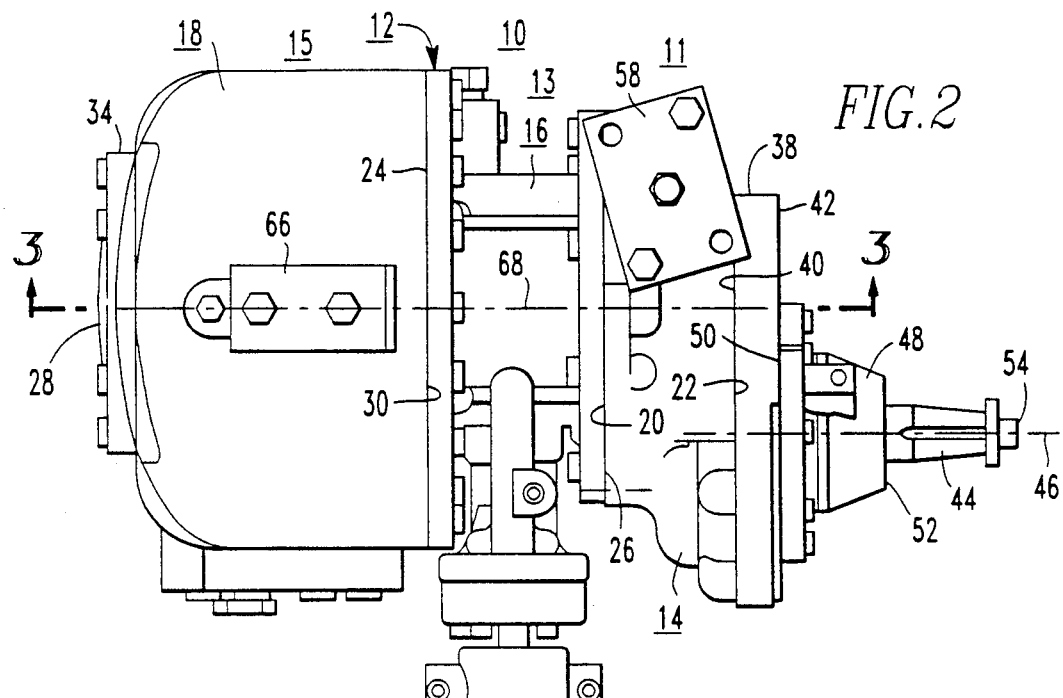
FIG. 2 is a plan view of the compressor shown in FIG. 1.
Figure 1:
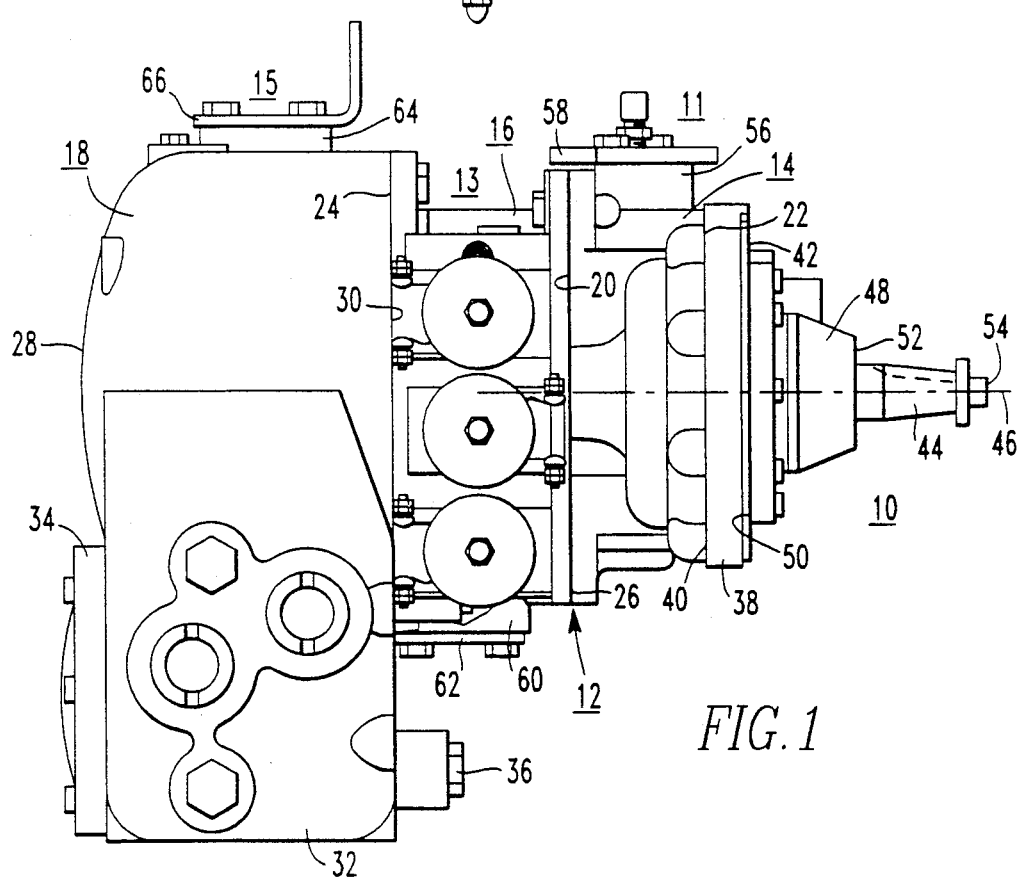
FIG. 1 is an elevational side view of a screw compressor which may be constructed according to the teachings of the invention.

Referring now to the drawings, and to FIGS. 1 and 2 in particular, there is shown a screw compressor 10 of the type which may be constructed according to the teachings of the invention, with FIG. 1 being a side elevational view of compressor 10, and FIG. 2 being a plan view. Screw compressor 10 includes suction, rotor and discharge sections 11, 13, and 15, respectively. Screw compressor 10 includes an external housing 12 having first, second and third main interconnected housing sections 14, 16, and 18. The first housing section 14 is a suction housing having first and second longitudinal ends 20 and 22, respectively. The second housing section 16 is a rotor housing having first and second axial ends 24 and 26, respectively, with the second axial end 26 being fixed to the first axial end 20 of the suction housing 14. The third housing section 18 is a discharge housing having a closed first axial end 28 and a second axial end 30. A portion of the second axial end 30 is fixed to the first axial end 24 of the rotor housing 16. The discharge housing 18 defines an integral oil sump 32 having a sump cover 34 at the first axial end 28 and an oil outlet connection 36 at the second axial end 30.

A drive gear cover 38 having first and second axial ends 40 and 42 has its first axial end 40 fixed to the second axial end 22 of the suction housing 14. The drive gear cover 38 defines an opening for receiving a drive shaft 44 having a longitudinal axis 46 which extends into the suction section 14 and is supported by spaced bearings (not shown) in the suction housing 14 and gear cover 38. In general, because of the gravity return sump 32, the axis 46 of drive shaft 44 is disposed in a generally horizontal orientation. A drive gear (not shown) is fixed to drive shaft 44, between the support bearings, in the suction housing 14. A drive shaft seal cover 48 having first and second axial ends 50 and 52, respectively, has its first axial end 50 fixed to the second axial end 42 of the gear cover 38, with a shaft seal and oil seal (not shown) being supported near the second axial end 52. An external end 54 of drive shaft 44 is adapted for connection to a prime mover, such as an internal combustion engine or an electric motor.

A suction port 56, shown with a cover plate 58, is associated with the suction housing 14, an intermediate pressure port 60, shown with a cover plate 62, is associated with the rotor housing 16, and a discharge port 64, shown with a cover plate 66, is associated with the discharge housing 18.

Figure 3:
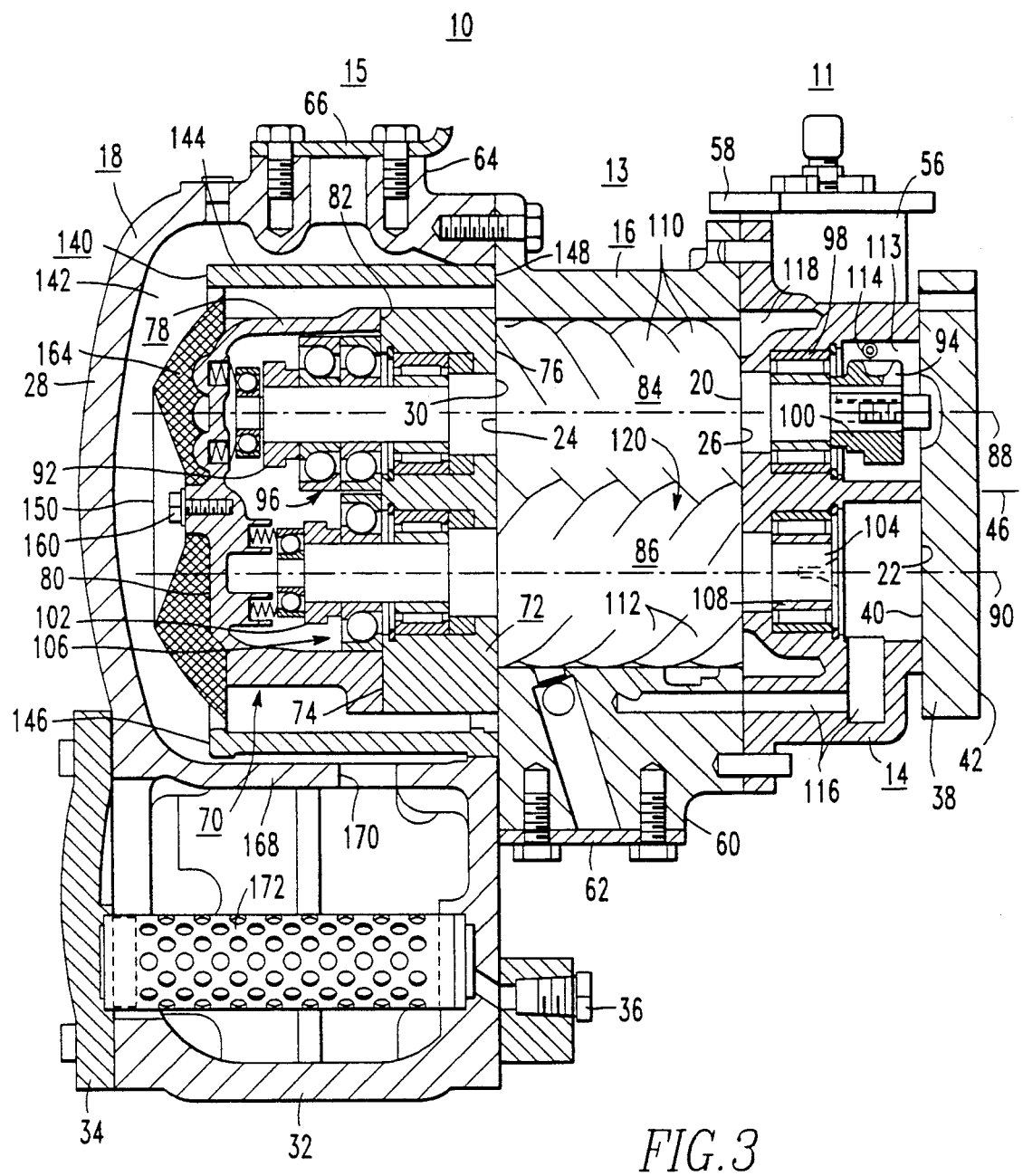
FIG. 3 is a cross-sectional view of the compressor shown in FIGS. 1 and 2, taken through a plane which extends through a predetermined longitudinal axis of the compressor, viewed in the direction of arrows III—III in FIG. 2.

FIG. 3 is a cross-sectional view of screw compressor 10, taken on a vertical plane disposed through the discharge port 6, with an edge of the vertical plane being shown in FIG. 2 with broken line 68, and with the viewing direction being illustrated by arrows III—III in FIG. 2. The discharge housing 18 surrounds inner discharge housing means or assembly 70, which is shown in perspective views in FIGS. 4 and 5, with FIG. 5 being an exploded perspective view. Inner discharge housing assembly 70 includes an inner discharge housing 72 having first and second axial ends 74 and 76, respectively, and an axial bearing cover 78 having first and second axial ends 80 and 82. The second axial end 82 of the axial bearing cover 78 is fixed to the first axial end of the inner discharge housing 72, and the inner discharge housing 72 is fixed to the first axial end 24 of the rotor housing 16.

First and second rotors 84 and 86 having longitudinal axes 88 and 90, respectively, are mounted for rotation within housing 12, with the first and second rotors 84 and 86 being shown in full notwithstanding that the section plane 68 intersects both longitudinal axes 88 and 90. The first rotor 84 has first and second axial ends 92 and 94, and rotor 84 is supported for rotation by bearing means 96 and 98 disposed near the first and second axial ends 92 and 94. A drive gear 100 is fixed immediately adjacent to the second axial end 94 which engages the drive gear (not shown) which is fixed to drive shaft 44. The second rotor 86 has first and second axial ends 102 and 104, and rotor 86 is supported for rotation by bearing means 106 and 108 disposed near the first and second axial ends 102 and 104.

While the drive shaft 44 does not appear in the sectional view of FIG. 3, the elevational position of drive shaft axis 46 is shown, which is parallel with the longitudinal axes 88 and 90 of rotors 84 and 86, and substantially midway between the elevations of axes 88 and 90. Rotation of drive shaft 44 thus drives the first rotor 84 via drive gear 100, with flutes 110 of rotor 84 engaging flutes 112 of rotor 86 to drive the second rotor 86.

Oil from sump 32 is injected into a drive gear cavity 113 via a nozzle 114, and this oil is directed to the flutes 110 and 112 via cavities, shown generally at 116, in the suction and rotor housings 14 and 16. Gas returning from an associated system, such as refrigerant vapor from a refrigeration system, returns to the suction port 56 and the intermediate pressure port 60, with the gas at both locations including a certain amount of compressor oil entrained in the returning gas streams. The returning gas and oil mixture which enters the suction port 56 enters the flutes at cavity 118 of the suction housing 14, and the returning gas and oil mixture which enters the intermediate pressure port 60 is injected at an intermediate flute position, such as indicated at 120.

This flooded type of screw compressor, wherein the injected oil is about 10–40% of the weight of the gas flow, provides an oil-gas stream at the exit end of the rotors 84 and 86 which has a high oil content. Since oil carried into an associated system, such as a refrigeration system, reduces the efficiency of heat transfer surfaces, such as in an economizer heat exchanger which returns a gas and oil mixture to the intermediate port 60, it is important to remove as much oil as possible from the oil-gas stream which exits the rotor housing 16 and enters the internal discharge housing 72.

Figure 4:
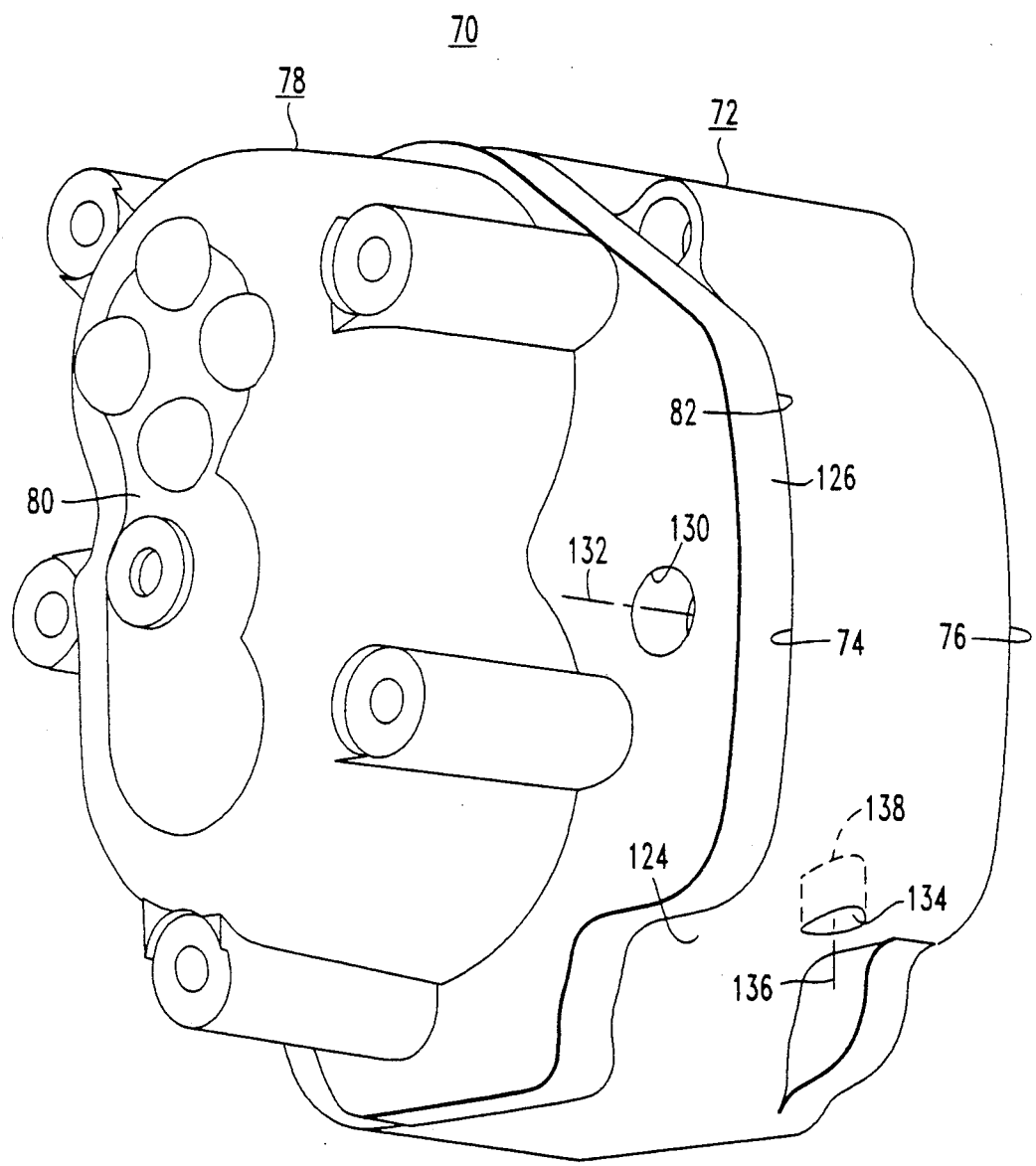
FIG. 4 is a perspective view of an internal housing assembly of a discharge section of the compressor, which is shown in section in FIG. 3.
Figure 5:
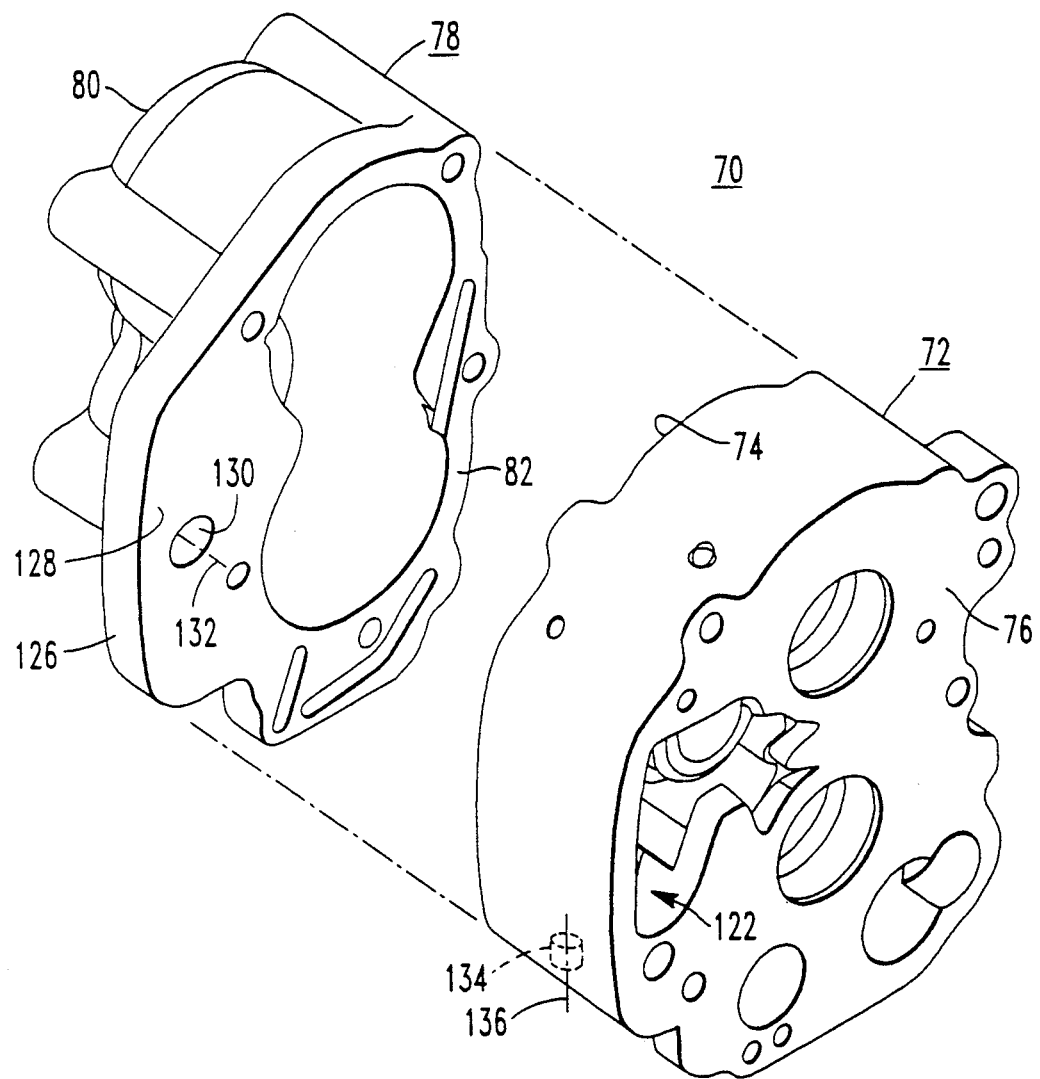
FIG. 5 is an exploded perspective view of the internal housing assembly shown in FIG. 4.

An oil removal arrangement constructed according to the teachings of the invention includes first, second and third successive oil removal stages. A first stage of oil removal includes an arrangement associated with the inner discharge housing assembly 70. As best shown in FIG. 5, the high pressure oil-gas stream from rotor housing 16 is delivered to a chamber or cavity 122 formed in the inner discharge housing 72. Chamber 122 extends completely through the inner discharge housing 72, extending from axial end 76 to axial end 74. The outer configuration of inner discharge housing 72 adjacent to chamber 122 includes an inward step which defines a lower, substantially horizontally extending wall portion 124, the inner surface of which defines a low point or bottom of chamber 122. The second axial end of axial bearing cover 78 includes a flange 126 which defines a relatively large flat surface 128 at the second axial end 82, with this flat surface 128 completely covering the portion of chamber 122 which appears at the first axial end 74 of the inner discharge housing 72. The first stage of oil removal includes the chamber 122, and a first opening 130 having a longitudinal axis 132, with the first opening being disposed in flange 126 of axial bearing cover 78. The first stage further includes a second opening 134 having a longitudinal axis 136, with the second opening being disposed in wall 124 of the inner discharge housing 72. The longitudinal axis 132 of the first opening 130 is oriented parallel with the drive axis 46 and the rotor axes 88 and 90. Thus, with the drive axis 46 disposed in the preferred horizontal orientation, axis 132 of opening 130 will be horizontally oriented. The location of opening 130 is such that it is approximately centered within the opening to chamber 122 at the first axial end 74 of the inner discharge housing 72. The longitudinal axis 136 of the second opening 134 is oriented such that it is perpendicular to a horizontal plane disposed through the axis 132 of the first opening 130. The axis 132 of the first opening 130 is least about 20 mm above the entrance 138 to the second opening 134, as best shown in FIG. 4. The area of first opening is selected to be about 55 to 65% of the total area defined by the sum of the areas of the first and second openings. Exemplary diameters for the first and second openings 130 and 134 are 13 mm and 9.5 mm, respectively.

The second and third stages of oil removal are performed by a filter 140. The outer discharge housing 18 defines a chamber or cavity 142 which is closed at the first axial end 28 of external discharge housing 18. The inner discharge housing assembly 70 extends into an open end of chamber 142 at the second axial end 30 of the outer discharge housing 18, with predetermined radial and axial spacings being provided between the outer surfaces of the inner discharge housing assembly 70 and the inner surfaces which define chamber 142. The predetermined axial and radial spacings are sufficient for filter 140 to completely enclose the outer surfaces of the inner discharge housing assembly 70.

More specifically, filter 140, which may be made of steel, for example, includes a cylindrical, foraminate body portion 144 having first and second axial ends 146 and 148, respectively. An exemplary wall thickness dimension for body portion 144 is 0.6 mm. The first axial end 146 is closed by an end wall 150 which curves outwardly from, and beyond, the first axial end 146 for a predetermined dimension, defining an outwardly curved portion 152. The end wall 150 then extends inwardly, back towards the first axial end 146, forming a slanted inwardly extending portion 154 which terminates in a centrally located wall portion 156. Wall portion 156 is oriented perpendicular to a longitudinal filter axis 158 which extends between the first and second axial ends of body portion 144. Filter axis 158 is oriented parallel with drive axis 46. The discharge port 64 and sump 32 are respectively disposed above and below filter axis 158. Wall portion 156 includes an opening 159 for receiving a mounting screw 160 which secures filter 140 to the first axial end 80 of the axial bearing cover 78. End wall 150 thus defines an endless or circular channel or concave portion 162, when viewing end wall 150 from the second axial end 148 of body portion 144, with concave portion 162 being uniformly spaced about the filter axis 158. The concave portion 162 receives a demister pad or filter pad 164 which has a configuration complementary to that of the concave portion 162, such that the filter pad 164 nests snugly against the inner surface of end wall 150. The maximum thickness dimension of filter pad 164, measured in a direction parallel with the filter axis 158, is preferably about 0.5 to 5 times the diameter of the first opening 130.

Filter pad 164 is preferably formed of flat or round wire thread having a cross sectional area in a range of about 0.1 mm$^2$ to about 1 mm$^2$, with the strands of the thread being closely spaced in a woven wire mesh arrangement which allows the gas portion of the oil-gas stream to pass through the strands while depositing small droplets of oil on the strands, wherein the end wall 150 and filter pad 164 co-operatively define the second stage of oil removal. The first opening 130, is oriented to direct the oil-gas stream directly at the filter pad 164, with the end wall 150 which supports filter pad 164 being spaced from the first opening 130 by a dimension equal to about one to eight times the diameter of the first opening 130.

As hereinbefore stated, the cylindrical body portion 144 is foraminous, i.e., it includes a large plurality of small openings 166. An exemplary arrangement includes a plurality of axially spaced rows of openings, such as sixteen rows, of openings, with about 40 to 50 openings per row, and with each opening having a diameter of about 4 mm-7 mm. The oil-gas stream from the first opening 130 thus flows through the wire mesh pad 164, removing oil droplets therefrom, and the oil-gas stream strikes the end wall 150 and is forced into a right angle turn, flowing outwardly through the filter pad 164 and then through the cylindrical, foraminate body portion 144. A large portion of the oil droplets still in the oil-gas stream coalesce on the inner wall of body portion 144, and on the inner walls which define the large plurality of openings 166, forming the third stage of oil removal. The gas stream, now with a large portion of the oil removed therefrom, then flows to an external system, such as a refrigeration system, via the discharge port 64. Oil removed in the oil-gas stream in the three successive oil removal stages flows under the influence of gravity through the openings 166 in body portion 144 where they collect on a lower wall 168 which defines a portion of cavity 142. The oil then flows to sump 32 via one or more openings 170 in lower wall 168 which extend from cavity 142 to sump 32 through wall portion 168. Oil in sump 32 is then directed back to nozzle 114 through an oil filter 172 disposed in sump 32, oil outlet connection 36, and suitable external means.

In summary, there has been disclosed a screw compressor 10 of the oil flooded type which efficiently removes oil from a high pressure oil-gas stream, before the gas stream exits a discharge port 64 of the compressor, via first, second and third successive oil removal stages. The first oil removal stage is formed by first and second openings 130 and 134 in an inner discharge housing assembly 70, with the first and second openings 130 and 134 communicating with a small chamber or cavity 122 defined by the discharge housing assembly 70. The first opening 130 is horizontally oriented in the same direction as the drive axis 46, and the second opening 134, which is located below the first opening 130, is substantially vertically oriented. Large droplets of oil separate from the oil-gas stream in chamber 122 as the oil-gas stream strikes the chamber walls and is forced to flow through the small first opening 130. Oil which separates from the oil-gas stream in chamber 122 flows out of chamber 122 via the second opening 134 to the inside of a filter 140, and to the sump 32 through openings 166 in the wall of a cylindrical, foraminate body portion 144 of filter 140. The oil-gas stream exiting housing assembly 70 via the first opening 130 is directed against the woven wire filter pad 164 and the end wall 150, removing small droplets of oil from the oil-gas stream on the wire strands of filter pad 164 as the oil-gas stream flows through filter pad 164 and is then forced to make a ninety degree outward turn, with the end wall 150 and filter pad 164 forming the second stage of oil removal. The oil-gas stream is then forced through the small openings 166 of cylindrical body portion 144 as the gas stream is directed to the discharge port 64, removing still more particles of oil on the inner wall of cylindrical body portion 144 and in the openings 166, to provide the third oil removal stage. It has been found that the oil removal arrangement of the invention greatly improves the oil removal. For example, discharging the oil gas mixture without the benefit of the cavity-dual opening first stage oil removal arrangement, and without the woven wire filter pad 164, results in an oil carry-over into an external system which is 10 to 30 times greater than the oil carry-over when the disclosed three-stage oil removal arrangement is used.

We claim:

1. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, and end wall closing the first axial end, and an oil separating filter pad disposed against said wall portion, said end wall of the filter means defining a circular channel portion uniformly spaced about the filter axis, with said channel portion snugly receiving said filter pad, said discharge port and oil sump being respectively disposed above and below the filter axis, said oil-gas stream exiting said internal housing means and entering said filter means via an oil-gas stream opening in the internal housing means which is part of a first stage of oil removal, said oil-gas stream being directed by said oil-gas stream opening against the filter pad, removing a portion of the oil from the oil-gas stream as the oil-gas stream is forced to turn 90 degrees to exit the filter means through the cylindrical body portion of the filter means, which removes additional oil from the oil-gas stream before the gas stream exits the discharge port, with oil trapped by the first stage of oil removal, the filter pad, and the cylindrical body portion of the filter flowing to the sump.

2. The screw compressor of claim 1 wherein the first stage of oil removal includes first and second openings in the internal housing means, with the first opening being the oil-gas stream opening, said first and second openings both providing fluid flow communication between the rotor section and the filter means, with said first opening having an axis disposed parallel with the drive axis to direct the oil-gas stream perpendicularly against the filter pad, and with the second opening, which is disposed at a lower elevation than the first opening, having an axis which is substantially perpendicular to a horizontal plane disposed through the axis of the first opening, said first and second openings separating a portion of the oil in an oil-gas stream within the internal housing means, with the separated oil flowing to the sump through the second opening and the cylindrical body portion of the filter means.

3. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, said oil-gas stream exiting said internal housing means and entering said filter means via an opening in the internal housing means which is part of a first stage of oil removal, said oil-gas stream being directed by said opening against the filter pad, removing a portion of the oil from the oil-gas stream as the oil-gas stream is forced to turn 90 degrees to exit the filter means through the cylindrical body portion of the filter means, which removes additional oil from the oil-gas stream before the gas stream exits the discharge port, with oil trapped by the first stage of oil removal, the filter pad, and the cylindrical body portion of the filter flowing to the sump, said filter pad including a woven wire mesh formed of wire having a cross-sectional area in the range of 0.1 mm$^2$ to 1 mm$^2$.

4. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, first and second openings in the internal housing means, said first opening being at least 20 mm above the second opening, said first and second openings both providing fluid flow communication between the rotor section and the filter means, said oil-gas stream exiting said internal housing means and entering said filter means via said first opening in the internal housing means, said first opening having an axis disposed parallel with the drive axis to direct the oil-gas stream exiting said internal housing means perpendicularly against the filter pad, said second opening being disposed at a lower elevation than the first opening, said second opening having an axis which is substantially perpendicular to a horizontal plane disposed through the axis of the first opening, said first and second openings separating a portion of the oil in an oil-gas stream within the internal housing means, to define a first stage of oil removal, said filter pad removing a portion of the oil from the oil-gas stream which is directed against said filter pad by said first opening, as the oil-gas stream is forced to turn 90 degrees by the end wall to exit the filter means through the cylindrical body portion of the filter means, said cylindrical body portion removing additional oil from the oil-gas stream before the gas stream exits the discharge port, said oil trapped by the first stage of oil removal, the filter pad, and the cylindrical body portion of the filter flowing to the sump.

5. An oil flooded screw compressor including a drive shaft having a longitudinal drive axis for substantially horizontal orientation; suction, rotor and discharge sections having suctions, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, first and second openings in the internal housing means, said first opening having an area which is 55 to 65% of the total area defined by the sum of the first and second openings, said first and second openings both providing fluid flow communication between the rotor section and the filter means, said oil-gas stream exiting said internal housing means and entering said filter means via said first opening in the internal housing means, said first opening having an axis disposed parallel with the drive axis to direct the oil-gas stream exiting said internal housing means perpendicularly against the filter pad, said second opening being disposed at a lower elevation than the first opening, said second opening having an axis which is substantially perpendicular to a horizontal plane disposed through the axis of the first opening, said first and second openings separating a portion of the oil in an oil-gas stream within the internal housing means, to define a first stage of oil removal, said filter pad removing a portion of the oil from the oil-gas stream which is directed against said filter pad by said first opening, as the oil-gas stream is forced to turn 90 degrees by the end wall to exit the filter means through the cylindrical body portion of the filter means, said cylindrical body portion removing additional oil from the oil-gas stream before the gas stream exist the discharge port, said oil trapped by the first stage of oil removal, the filter pad, and the cylindrical body portion of the filter flowing to the sump.

6. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, first and second openings in the internal housing means, said first and second openings both providing fluid flow communication between the rotor section and the filter means, said oil-gas stream exiting said internal housing means and entering said filter means via said first opening in the internal housing means, said first opening having an axis disposed parallel with the drive axis to direct the oil-gas stream exiting said internal housing means perpendicularly against the filter pad, said second opening being disposed at a lower elevation than the first opening, said second opening having an axis which is substantially perpendicular to a horizontal plane disposed through the axis of the first opening, said first and second openings separating a portion of the oil in an oil-gas stream within the internal housing means, to define a first stage of oil removal, said filter pad removing a portion of the oil from the oil-gas stream which is directed against said filter pad by said first opening, as the oil-gas stream is forced to turn 90 degrees by the end wall to exit the filter means through the cylindrical body portion of the filter means, said cylindrical body portion removing additional oil from the oil-gas stream before the gas stream exits the discharge port, said oil trapped by the first stage of oil removal, the filter pad, and the cylindrical body portion of the filter flowing to the sump, said end wall of the filter means being spaced from the first opening by a dimension in a range of one to eight times the diameter of the first opening.

7. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, first and second openings in the internal housing means, said first and second openings both providing fluid flow communication between the rotor section and the filter means, said oil-gas stream exiting said internal housing means and entering said filter means via said first opening in the internal housing means, said first opening having an axis disposed parallel with the drive axis to direct the oil-gas stream exiting said internal housing means perpendicularly against the filter pad, said second opening being disposed at a lower elevation than the first opening, said second opening having an axis which is substantially perpendicular to a horizontal plane disposed through the axis of the first opening, said first and second openings separating a portion of the oil in an oil-gas stream within the internal housing means, to define a first stage of oil removal, said filter pad removing a portion of the oil from the oil-gas stream which is directed against said filter pad by said first opening, as the oil-gas stream is forced to turn 90 degrees by the end wall to exit the filter means through the cylindrical body portion of the filter means, said cylindrical body portion removing additional oil from the oil-gas stream before the gas stream exits the discharge port, said oil trapped by the first stage of oil removal, the filter pad, and the cylindrical body portion of the filter flowing to the sump, said filter pad having a maximum thickness dimension, measured in a direction parallel with the filter axis, which is 0.5 to 5 times the diameter of the first opening.

8. An oil flooded screw compressor including a drive shaft having a longitudinal drive axis for substantially horizontal orientation; suction, rotor and discharge sections having suction, intermediate pressure, and discharge ports, respectively; and an oil sump for collection of oil below the discharge section, characterized by:

the discharge section having radially spaced internal and external housing means, with the internal housing means receiving an oil-gas stream from the rotor section, filter means disposed to surround the internal housing means, said filter means including a cylindrical, foraminate body portion having first and second axial ends, a longitudinal filter axis disposed parallel to the drive axis, an end wall closing the first axial end, and an oil separating filter pad disposed against said wall portion, said discharge port and oil sump being respectively disposed above and below the filter axis, said oil-gas stream exiting said internal housing means and entering said filter means via an oil-gas stream opening in the internal housing means, with the oil-gas stream opening being part of a first stage of oil removal, said oil-gas stream being directed by said oil-gas stream opening against the filter pad, removing a portion of the oil from the oil-gas stream as the oil-gas stream is forced to turn 90 degrees to exit the filter means through the cylindrical body portion of the filter means, which removes additional oil from the oil-gas stream before the gas stream exits the discharge port, with oil trapped by the first stage of oil removal, the filter pad, and the cylindrical body portion of the filter flowing to the sump, said internal housing means including an assembly which includes a discharge housing having first and second axial ends, and an axial bearing cover having a flange disposed against the first axial end of the discharge housing, said discharge housing and axial bearing cover cooperatively defining a chamber for receiving the oil-gas stream from the rotor section, with a portion of the flange having a surface which forms part of the chamber, with said flange surface facing the flow of the oil-gas stream from the rotor section, said first stage of oil removal including first and second openings, with said first opening being the oil-gas stream opening, said first opening being in the portion of the flange which defines a portion of the chamber, said second opening being in the discharge housing, said second opening being disposed at a lower elevation than said first opening, whereby a portion of the oil in the oil-gas stream separates from the oil-gas stream as the oil-gas stream strikes the flange and is forced to flow through the first opening and against said filter pad, with separated oil flowing to the sump through the second opening and the cylindrical body portion of the filter means.

9. The screw compressor of claim 8 wherein the first opening is at least 20 mm above the second opening.

10. The screw compressor of claim 8 wherein the first opening has an area which is 55 to 65% of the total area defined by the sum of the first and second openings.

11. The screw compressor of claim 8 wherein the end wall of the filter means is spaced from the first opening by a dimension in a range of one to eight times the diameter of the first opening.

12. The screw compressor of claim 8 wherein the filter pad has a maximum thickness dimension measured in a direction parallel with the filter axis which is 0.5 to 5 times the diameter of the first opening.

13. An oil flooded screw compressor including a drive shaft having a longitudinal drive axis for substantially horizontal orientation; suction, rotor and discharge sections having suction, intermediate pressure, and discharge ports, respectively, and an oil sump for collection of oil below the discharge section, characterized by:

an oil separation arrangement having first, second and third successive stages for removing oil from an oil-gas stream which flows from the rotor section to the discharge section, said discharge section having radially spaced internal and external housing means, said internal housing means including a discharge housing having first and second axial ends, and an axial bearing cover having a flange disposed against the first axial end of the discharge housing, said discharge housing and axial bearing cover cooperatively defining a chamber for receiving the oil-gas stream from the rotor section, said flange including a surface at the end of the chamber which faces the flow of the oil-gas stream from the rotor section, with the first stage of oil separation including first and second openings respectively disposed in the flow facing surface of the flange and in the discharge housing, with the second opening being disposed at a lower elevation than the first opening, whereby a portion of the oil in the oil-gas stream separates from the oil-gas stream in the chamber and flows through the second opening as the oil-gas stream strikes the flange and is forced to flow through the first opening, filter means surrounding the discharge housing and said first and second openings, said filter means having a cylindrical, foraminate body portion having a longitudinal filter axis parallel with the drive axis, and an end wall which includes a filter pad, the oil-gas stream flowing through the first opening being directed against the filter pad, with the filter pad defining the second oil separation stage, removing oil droplets from the oil-gas stream and forcing the oil-gas stream to flow perpendicular to the filter axis and to the discharge port through the foraminate body portion of the filter means, with the foraminate body portion defining the third stage of oil removal, coalescing still additional oil particles in the oil-gas stream for flow to the sump through the foraminate body portion of the filter means.

14. The screw compressor of claim 13 wherein the end wall of the filter means defines a circular channel portion uniformly spaced about the filter axis, with said channel portion snugly receiving the filter pad.

15. The screw compressor of claim 13 wherein the filter pad is a wire mesh formed of wire having an cross-sectional area in the range of 0.1 mm$^2$ to 1 mm$^2$.

16. The screw compressor of claim 13 wherein the first opening is at least 20 mm above the second opening.

17. The screw compressor of claim 13 wherein the first opening has an area which is 55 to 65% of the total area defined by the sum of the first and second openings.

18. The screw compressor of claim 13 wherein the end wall portion of the filter means is spaced from the first opening by a dimension in a range of one to eight times the diameter of the first opening.

19. The screw compressor of claim 13 wherein the filter pad has a maximum thickness dimension, measured in a direction parallel with the filter axis, which is 0.5 to 5 times the diameter of the first opening.

* * * * *